United States Patent
Bergquist

(10) Patent No.: US 8,598,798 B2
(45) Date of Patent: Dec. 3, 2013

(54) CAMERA FLASH WITH RECONFIGURABLE EMISSION SPECTRUM

(75) Inventor: Johan Bergquist, Tokyo (JP)

(73) Assignee: Core Wireless Licensing S.a.r.l, Luxembourg (LU)

( * ) Notice: Subject to any disclaimer, the term of this patent is extended or adjusted under 35 U.S.C. 154(b) by 830 days.

(21) Appl. No.: 12/322,709

(22) Filed: Feb. 4, 2009

(65) Prior Publication Data

US 2009/0243493 A1 Oct. 1, 2009

Related U.S. Application Data

(60) Provisional application No. 61/072,151, filed on Mar. 28, 2008.

(51) Int. Cl.
*H05B 37/00* (2006.01)

(52) U.S. Cl.
USPC ......... 315/241 P; 315/291; 396/155; 396/164

(58) Field of Classification Search
USPC ........... 315/241 P, 241 S, 307, 291, 297, 301; 396/155, 176, 182, 164; 348/370, 371; 362/11, 3
See application file for complete search history.

(56) References Cited

U.S. PATENT DOCUMENTS

| | | | | |
|---|---|---|---|---|
| 5,909,245 A | * | 6/1999 | Aoki et al. | 348/371 |
| 6,379,022 B1 | | 4/2002 | Amerson et al. | 362/231 |
| 7,106,378 B2 | * | 9/2006 | Kawakami | 348/371 |
| 7,274,160 B2 | * | 9/2007 | Mueller et al. | 315/312 |
| 7,520,634 B2 | * | 4/2009 | Ducharme et al. | 362/800 |
| 7,634,191 B2 | * | 12/2009 | Kleverman et al. | 396/155 |
| 2003/0052992 A1 | * | 3/2003 | Nakata | 348/371 |
| 2004/0037462 A1 | * | 2/2004 | Lewis et al. | 382/181 |
| 2005/0134723 A1 | | 6/2005 | Lee et al. | 348/370 |
| 2005/0135079 A1 | * | 6/2005 | Yin Chua et al. | 362/11 |
| 2008/0075447 A1 | | 3/2008 | Wernersson | 396/155 |

FOREIGN PATENT DOCUMENTS

JP 2006010745 1/2006

* cited by examiner

*Primary Examiner* — David H Vu

(57) ABSTRACT

A method and an apparatus for spectrum synthesis for use in a flash unit, wherein the spectrum synthesis includes combining a plurality of emissive light sources in order to provide a combine output beam and producing the output spectrum for the combined output beam at least based on a reference spectrum. The reference spectrum can be obtained by sensing the spectrum of ambient light or selected from a plurality of stored spectra. The flash unit has at least two emissive light sources and each of the light sources can be adjusted relative to each other so that the outputs from the light sources can mimic a selected illumination scenario. It is possible to use a mixture of quantum dots to tailor each light source so that the combined spectra from different light sources can reasonably mimic a number of frequently used illumination scenario.

21 Claims, 8 Drawing Sheets

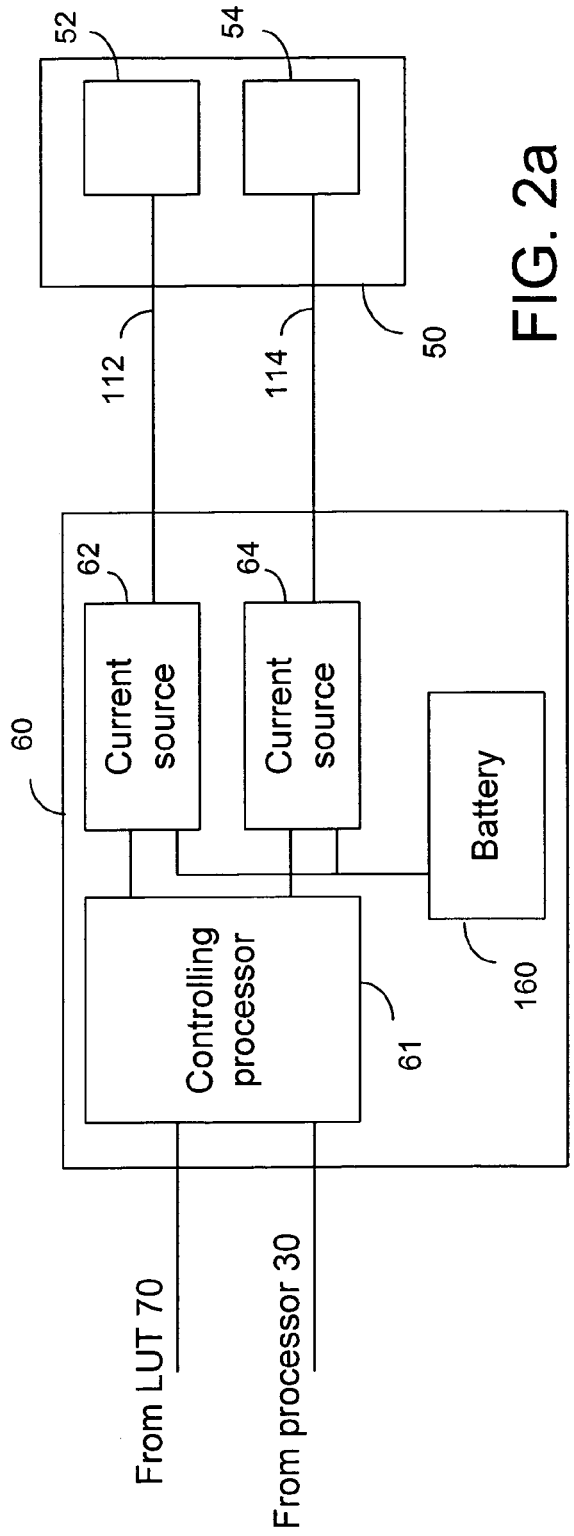
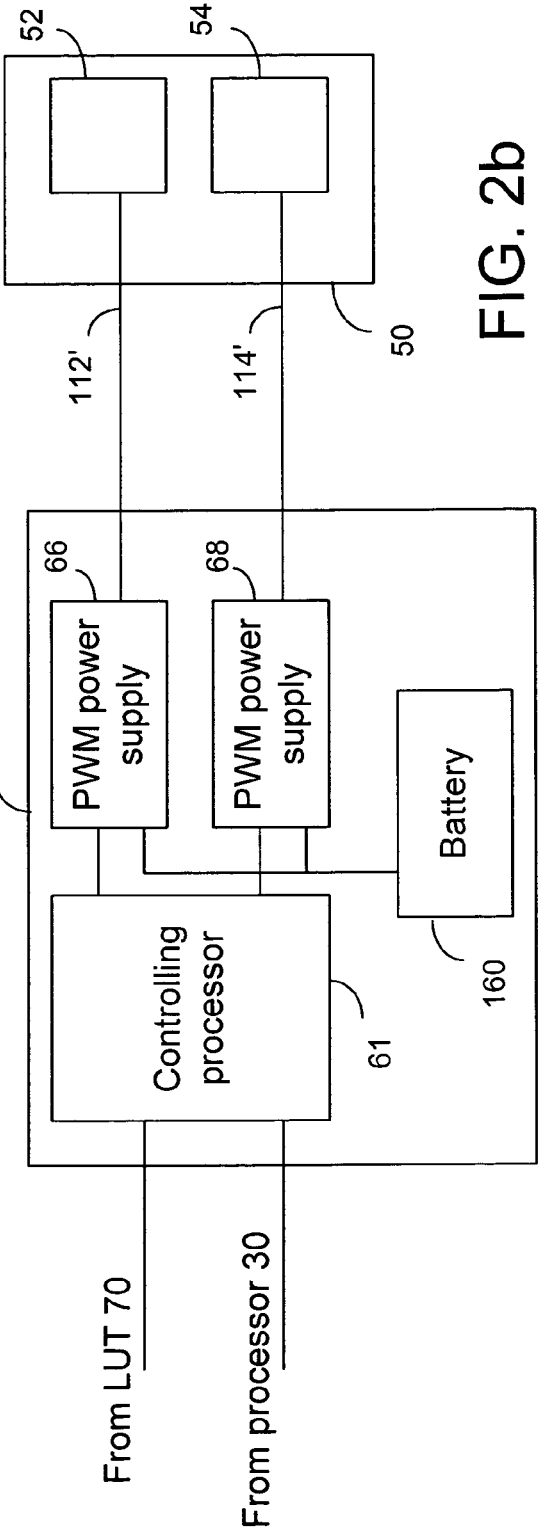

CAMERA FLASH WITH RECONFIGURABLE EMISSION SPECTRUM

This patent application is based on and claims benefit to U.S. Patent Application Ser. No. 61/072,151, filed Mar. 28, 2008.

FIELD OF THE INVENTION

The present invention is related generally to illumination for both photography and general lighting and, in particular, to camera flash.

BACKGROUND OF THE INVENTION

An illumination source is largely characterized by luminous flux (lumen) and spectral power distribution (W/nm). The former is a metric of the perceived brightness whereas the latter determines the color of the light via multiplication with the color matching functions. The color of white light can be expressed both by CIE chromaticity coordinates and by the correlated color temperature (CCT), that is, the temperature of a black-body radiator resulting in a spectrum which, when multiplied by the color matching functions, yields the same color as the original illumination source. For example, an incandescent light bulb has a spectrum corresponding to a CCT of 3200° K. whereas a Xenon camera flash typically has a CCT of 9000° K. The CCT of daylight varies by weather, location and time of the day and year.

The human vision adapts to the illumination so an object with flat reflection spectrum looks white under many different illumination sources. In contrast, a film-based camera is not able to adapt. In a digital camera, the sensor usually has fixed RGB (red, green, blue) filters, post-processing of the raw image data can be used to adjust the white balance to a predefined value, usually expressed in CCT. In particular, in consumer cameras, this process is automated via automatic white balancing (AWB) algorithms, i.e. the white point of the image is adjusted after it has been recorded. These algorithms are often very intricate and advanced but the result is always implemented by adjusting the relative gain in the red, green, and blue channels.

SUMMARY OF THE INVENTION

The present invention provides a method and an apparatus for spectrum synthesis for use in a flash unit. The spectrum synthesis comprises combining a plurality of emissive light sources in order to provide a combine output beam and producing the output spectrum for the combined output beam at least based on a reference spectrum. The reference spectrum can be obtained by sensing the spectrum of ambient light or selected from a plurality of stored spectra. It is possible that a user can determine the type of ambient light source and select the reference spectrum based on the determined type. The flash unit has at least two emissive light sources and each of the light sources can be adjusted relative to each other so that the outputs from the light sources can mimic a selected illumination scenario. When the number of the light sources in the flash unit is too small, the difference between the synthesized spectrum and the spectrum of the selected illumination scenario can be significant. It is possible to use a mixture of quantum dots to tailor each light source so that the combined spectra from different light sources can reasonably mimic a number of frequently used illumination scenario. In general, the difference between the synthesized spectrum and the spectrum of the selected illumination scenario can be reduced by increasing the number of the light sources in a flash unit. In any case, the minimum number of the light sources is two.

Thus, the first aspect of the present invention is a method for spectral synthesis. According to one embodiment of the present invention, the method includes providing at least a first emissive light source and a second emissive light source for a camera flash, wherein the first emissive light source is configured for producing a first light output with a first spectral distribution, and the second emissive light source is configured for producing a second light output with a second spectral distribution different from the first spectral distribution; and providing electrical access to the first and second emissive light sources such that at least the first light output is adjustable relative to the second light output for producing a combined light output with a third spectral distribution.

The second aspect of the present invention is a flash module. According to one embodiment of the present invention, the flash unit includes at least a first emissive light source configured for producing a first light output with a first spectral distribution; and a second emissive light source configured for producing a second light output with a second spectral distribution different from the first spectral distribution, wherein at least the first light output is adjustable relative to the second light output for producing a combined light output with a third spectral distribution for a camera flash. The adjustment of the light output can be achieved by controlling the amplitude of the electrical current or by controlling the pulse-width in a pulse-width modulated current.

The third aspect of the present invention is a stand-alone camera or a camera in an electronic device such as a mobile phone, the camera having a flash unit, wherein the flash unit includes at least a first emissive light source configured for producing a first light output with a first spectral distribution; and a second emissive light source configured for producing a second light output with a second spectral distribution different from the first spectral distribution, wherein at least the first light output is adjustable relative to the second light output for producing a combined light output with a third spectral distribution for a camera flash. The camera can be a digital camera or a film-based camera.

The present invention will become apparent upon reading the description of the drawings taken in conjunction with FIGS. 1 to 7.

BRIEF DESCRIPTION OF THE DRAWINGS

FIG. 2a is an illumination module, according to one embodiment of the present invention.

FIG. 2b is an illumination module, according to another embodiment of the present invention.

DETAILED DESCRIPTION OF THE INVENTION

Figure 1A:
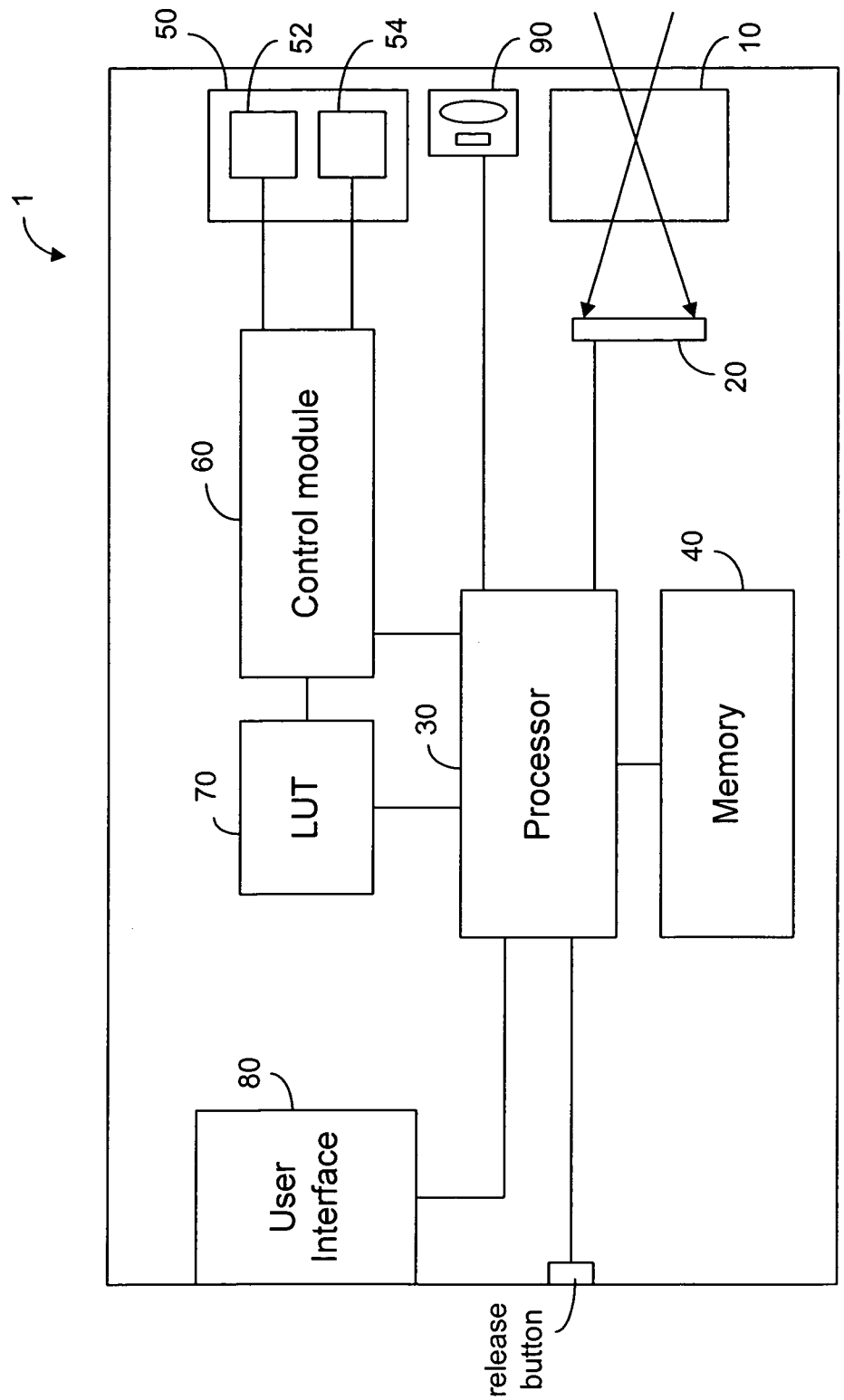
FIG. 1a is a block diagram showing a digital camera, according to one embodiment of the present invention.

The optimization of the transmission spectra of the color filters in a digital camera assumes a standard illuminant, standard object reflectance spectrum, standard object preference, or a combination thereof. This means that the camera is, from a sensitivity point of view, sub-optimized for most illumination sources, especially for camera flash light. In order to perform AWB, the gain factors need to be adjusted for each R, G, and B channel to achieve the desired white balance (CCT). Increased gain inevitably results in larger image noise and a grainier image.

If the photograph is taken in the illumination for which the sensor is spectrally optimized, gain can be minimized. In most situations, however, the illumination is a superposition of several sources so the resultant spectrum, and hence the CCT, is not well defined across the image. This situation occurs, for example, indoors close to a window where the object is illuminated by both daylight and artificial light (incandescent bulbs, fluorescent lamps, light-emitting diode (LED) lamps etc.). The same problem occurs when using a conventional flash in ambient light.

A problem with both LED and Xenon flashes is the low color rendering index (CRI) which is caused by their discontinuous emission spectrum (pseudo-white LEDs have only blue and yellow light). This results in missing colors or depth when taking photographs or poor light quality when the mobile phone flash is used in torch mode. Image noise generated by gain is typically reduced by low-pass or other filtering in the image-processing chain of the camera but this leads to artifacts and reduced sharpness.

The problem of mixed illumination sources and a white point CCT varying within the image has been solved by applying filters to one or several of the sources. For example, a blue filter can be attached to incandescent lamps to give the same CCT as daylight. However, the spectra are still not identical which can confuse the AWB algorithm. Also, it is not practical to carry and attach blue filters every time a photo is to be taken. AWB algorithms are not perfect and objects with extreme color distributions often appear with the wrong color balance. If instead the actual illumination spectrum can be identified, more accurate white balancing can be achieved.

Accordingly one embodiment of the present invention, the first step is to determine the type of ambient light source. The subsequent step is to adjust the spectrum of the flash so that the spectrum and, therefore, the CCT coincide with that of the ambient light. When shooting occurs in darkness or in dim ambient light where the majority of the illumination comes from the flash, the flash spectrum is adjusted to that of the camera/film to achieve maximum camera/film speed. The synthesized/identified spectrum is fed back to the AWB algorithm to achieve the actual white point without analyzing the image or adjusting the RGB gain factors which leads to reduced color artifacts. When used in the torch mode of the flash or in general lighting, a spectrum of any light source can be synthesized. This is useful for accurate rendering of surface colors.

Synthesizing an arbitrary flash spectrum can be accomplished by combining two or more individually addressable LEDs with different spectra. The modulation of each LED is done either by current, pulse width, or a combination thereof. The emission could originate either from the LED itself, LED+broadband phosphor, or LED+any photoluminescent material, including quantum dots (QD), which allow precise spectral design over the entire visible range when combined with deep purple or UV exciting LEDs. The emission can also solely be originated from the photoluminescent material. The emission spectrum can be simply a Gaussian distribution with the peak wavelength determined only by the QD size. Typical full-widths at half-maximum (FWHM) are 10-15 nm and peak wavelength controllability within ±1 nm. By mixing QDs of several sizes and tuning their number ratios, a tailored spectrum for each LED can be obtained.

Another way to synthesize the flash spectrum is using a fast spatial light modulator (SLM) below which QDs or mixtures of QDs corresponding to the different spectra are printed. The QDs can then be excited by a single LED and the duty of each wavelength is controlled by the SLM. SLMs with microsecond response can be implemented with both ferroelectric liquid crystals (FLCs) and micro electromechanical systems (MEMS). In both cases, a rotationally symmetric structure and separate Fresnel lenses for each emitting region is required to distribute the light from each emitter uniformly.

To reproduce the approximate spectra of all possible illumination scenarios (sunlight, cloudy sky, tungsten lamp, fluorescent light, etc.), the fluent weights of the base spectra are iteratively adjusted until the difference between the illuminant spectrum and the synthesized spectrum converges to a minimum. When the base spectral weights (current and/or pulse widths) have been determined, they are stored in a look-up table (LUT) along with an illuminant look-up index.

The illuminant indices are determined from the spectrally calibrated sensor response. The sensor could be a spectrometer, trichromatic sensor, or a two-channel sensor (see Table 1), or the camera itself.

The LUT also contains pre-calculated CCTs of the light sources which are fed into the white-balancing algorithm (this already uses CCT as an input parameter). In this way, color artifacts from determining the white point via image analysis can be avoided.

TABLE 1

Example of Relative Response from A Two-Channel Ambient Light Sensor

| LIGHT SOURCE | CCT | CHANNEL RATIO |
| --- | --- | --- |
| F11 (Fluorescent lamp) | 3700 K | 0.127860953 |
| F12 (Fluorescent lamp) | 2800 K | 0.133593675 |
| Daylight simulator | 5600 K | 0.100576456 |
| Halogen lamp | 2600 K | 0.567822155 |

In order to minimize the risk for temporal color artifacts in scanning sensor systems, e.g. CMOS sensors, current modulation is preferred over temporal modulation. It is also possible to distribute energy of the shortest pulse throughout a burst of multiple pulses, the width of which corresponds to the longest pulse width of all emitters.

In sum, according to various embodiments of the present invention, the spectrum of a flash is synthesized by using two or more emissive light sources, at least one of the light sources has a different spectrum from the other. The flash can be used in a digital camera, a film-based camera, or a separate unit. A block diagram of a digital camera, according to one embodiment of the invention is shown in FIG. 1a.

As shown in FIG. 1a, the digital camera 1 has a single lens or a lens system 10 for forming an image on a sensor 20, such as a solid-state sensor. Under the control of a processor 30, an image is captured by the user taking a picture. The captured image can be stored in a memory 40. The camera 1 also has a flash unit 50 with at least two emissive light sources 52 and 54 for emitting lights with different spectral ranges or distributions. The flash unit 50 is operatively connected to a control module 60 so that the light sources 52 and 54 can be separately controlled or addressed by the control module 60. An LUT is operatively connected to the control module 60 and the processor 30. The camera 1 also has a user-interface 80 to allow a user to choose the settings of the camera, including the choice of illumination scenarios. The camera 1 may have a light spectrum sensing unit 90 for determining the spectral distribution of ambient light, for example. The sensing unit 90 typically has a diffusing light collecting lens to average the illumination from many different directions. Alternatively, the camera itself is used as a light sensor by temporarily defocusing to achieve the same effect. The sensing unit 90 is calibrated against all possible illumination sources and the calibration data is written into the LUT. The signals from the sensing unit for an arbitrary illumination are then compared to the LUT, the corresponding base spectrum weighs are loaded, and the flash is driven with the corresponding weighs. If the sensor signal is below a pre-defined value, the flash unit is identified as the main illumination, and the emitter weights are selected to produce a spectrum corresponding to the maximum spectral sensitivity of the sensing unit.

Figure 1B:
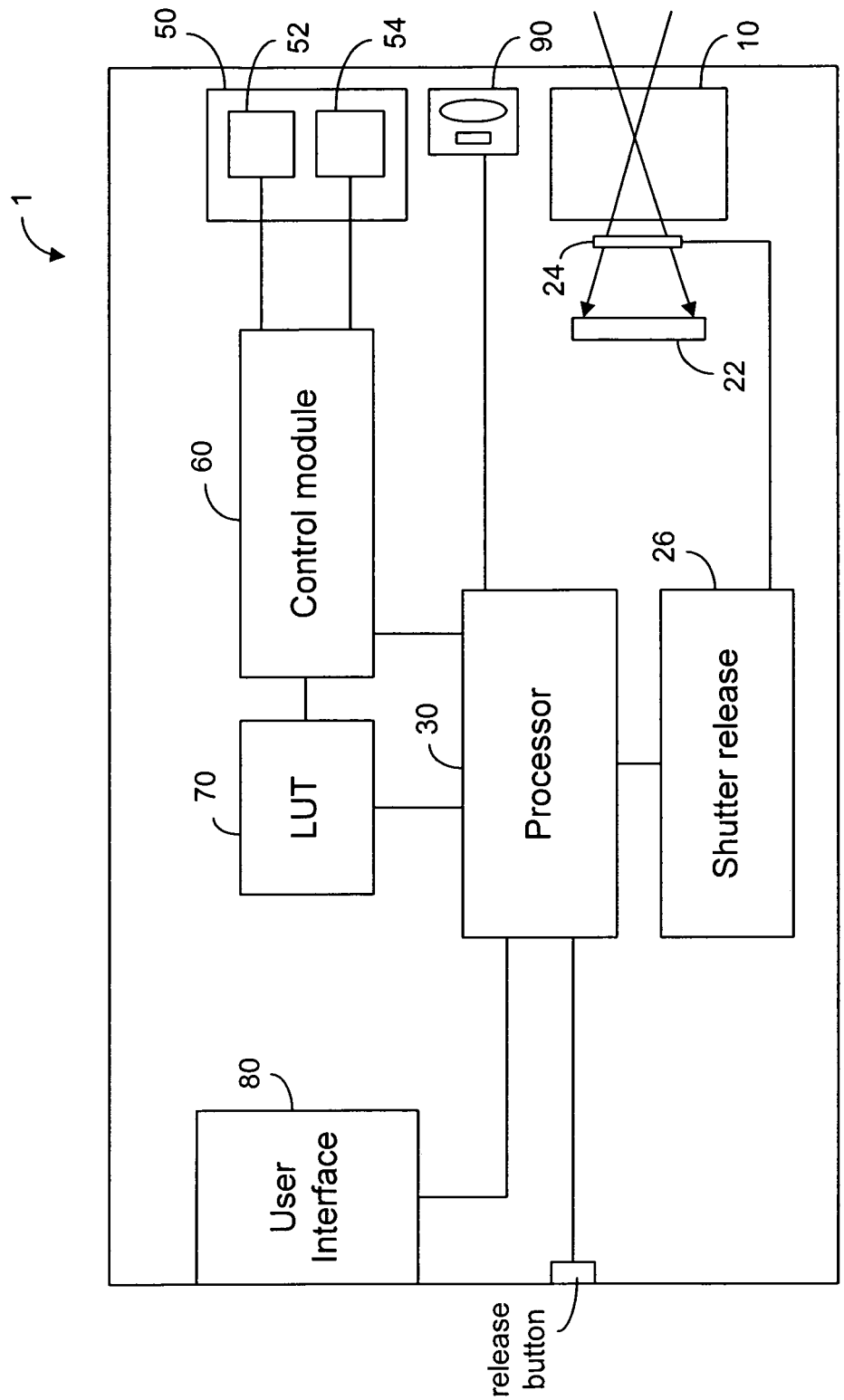
FIG. 1b is a block diagram showing a film-based camera, according to one embodiment of the present invention.

A film-based camera is shown in FIG. 1b. As shown in FIG. 1b, the camera 1 allows a section of a photographic film 22 to be placed at the image plane of the lens or lens system 10 for recording an image. A shutter 24, under the control of the processor 30 and a shutter release driver 26, is used to control the exposure on the film.

In spectrum synthesis, according to one embodiment of the present invention, the output of the light sources 52 and 54 is controlled by the electrical current. As shown in FIG. 2a, the control unit 60 has at least a first current source 62 and a second current source 64 to separately provide electrical current 112 and electrical current 114 to the light sources 52 and 54. The electrical power source can be a battery 160 or a transformer connected to another power source, such as an electrical outlet. According to another embodiment of the present invention, the output of the light sources 52 and 54 is controlled by the pulse-width of two pulse-width modulation power supplies 66 and 68, as shown in FIG. 2b. The current 112' and the current 114', as shown in FIG. 2b, are pulse-width modulated currents.

Figure 2C:
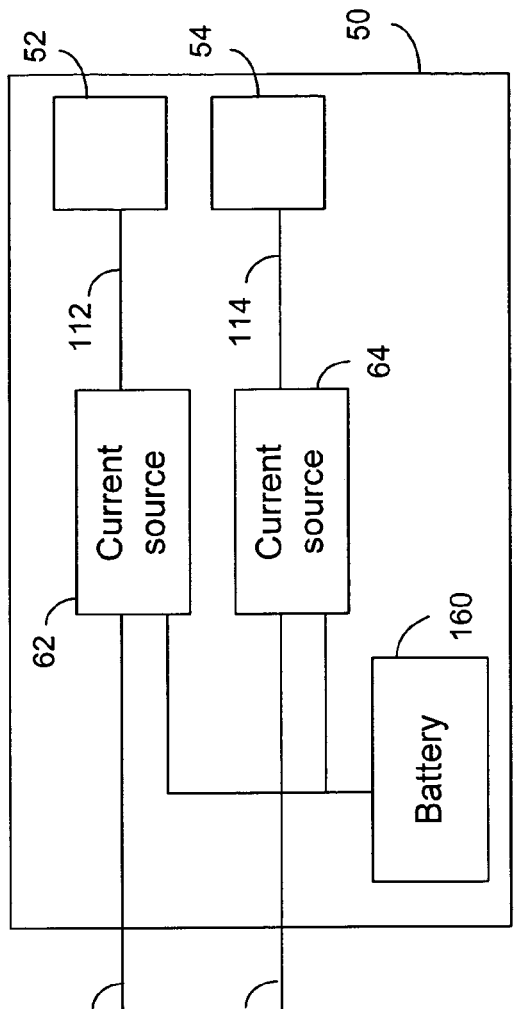
FIG. 2c is an illumination module, according to yet another embodiment of the present invention.
Figure 2D:
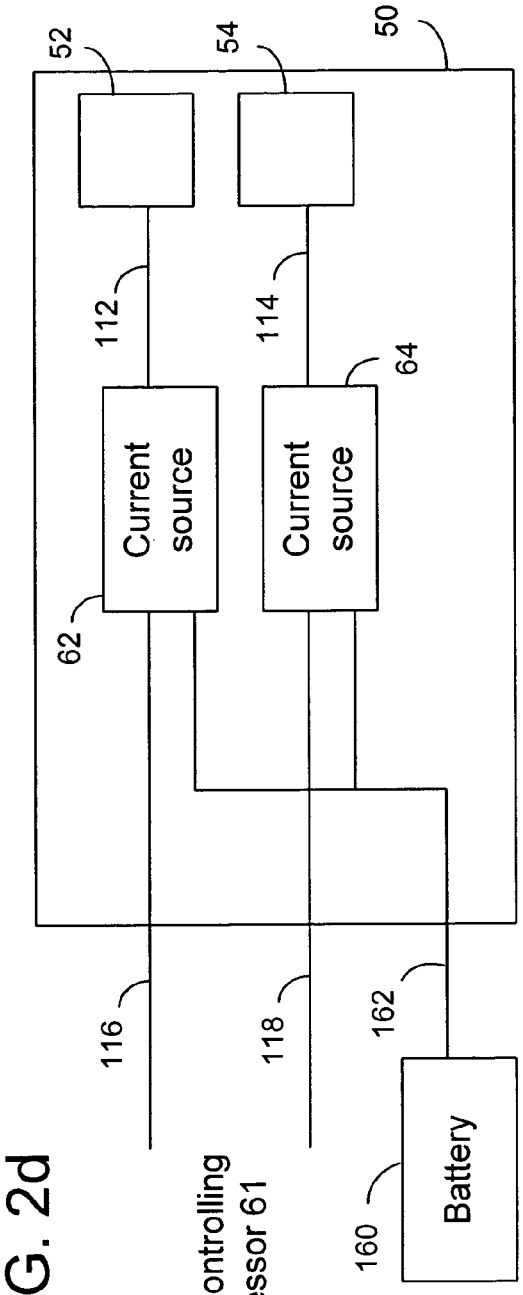
FIG. 2d is an illumination module, according to a different embodiment of the present invention.

According to yet another embodiment of the present invention, the flash unit 50 has a battery 160 and the current sources 62 and 64 to provide electrical current to the light sources 52 and 54, as shown in FIG. 2c. The flash unit 50 also has electrical connectors for receiving control signals 116 and 118 from an external controlling processor 61 so as to control the output of one or both of the light sources.

According to a different embodiment of the present invention, the flash unit 50 does not include a battery 160. Instead, the flash unit 50 has electrical connectors 162 for connecting to an external battery.

Figure 3A:
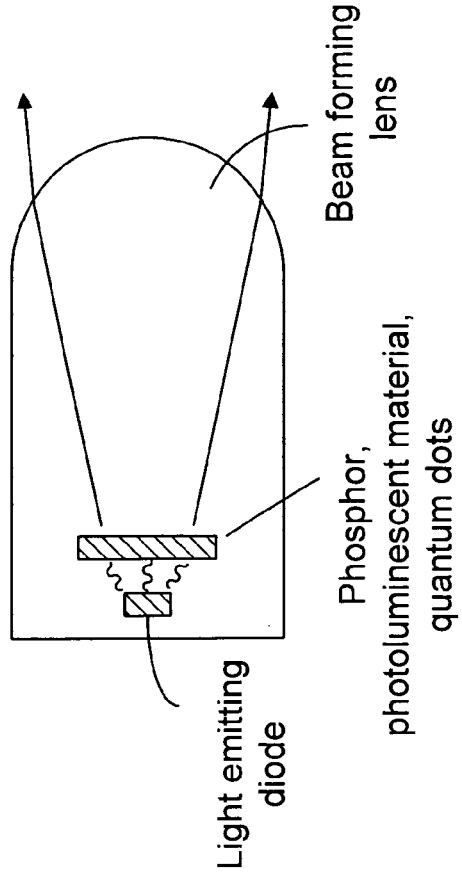
FIG. 3a shows an emissive light source, according to one embodiment of the present invention.
Figure 3B:
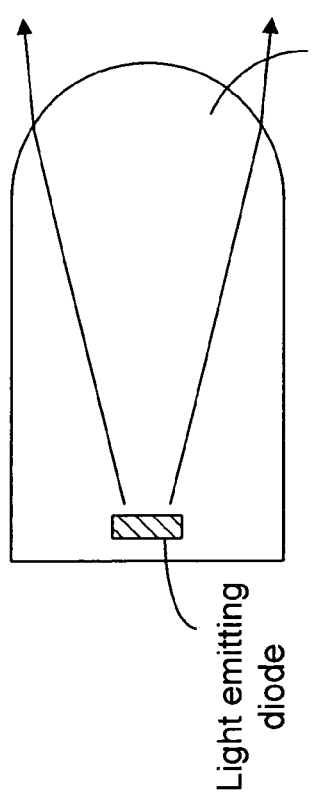
FIG. 3b shows an emissive light source, according to another embodiment of the present invention.

FIG. 3a shows an emissive light source for use in the flash unit 50. As shown, the emissive light source 52, 54 has a light-emitting diode encased in a transparent body with a lens for beam forming. Alternatively, an optically excitable material is placed between the beam forming lens and the light-emitting diode so that the material can be used as a secondary emissive source, as shown in FIG. 3b. For example, the optically excitable material can be a broadband phosphor or a photoluminescent material, including quantum dots. The light-emitting diode in this arrangement, can be the diode that emits light in the deep purple or UV. The output of the light source as shown in FIG. 3a and FIG. 3b can be controlled by the input current to the light emitting diode as illustrated in FIG. 2a. Alternatively, the output is controlled by pulse width modulation, as illustrated in FIG. 2b.

Figure 4:
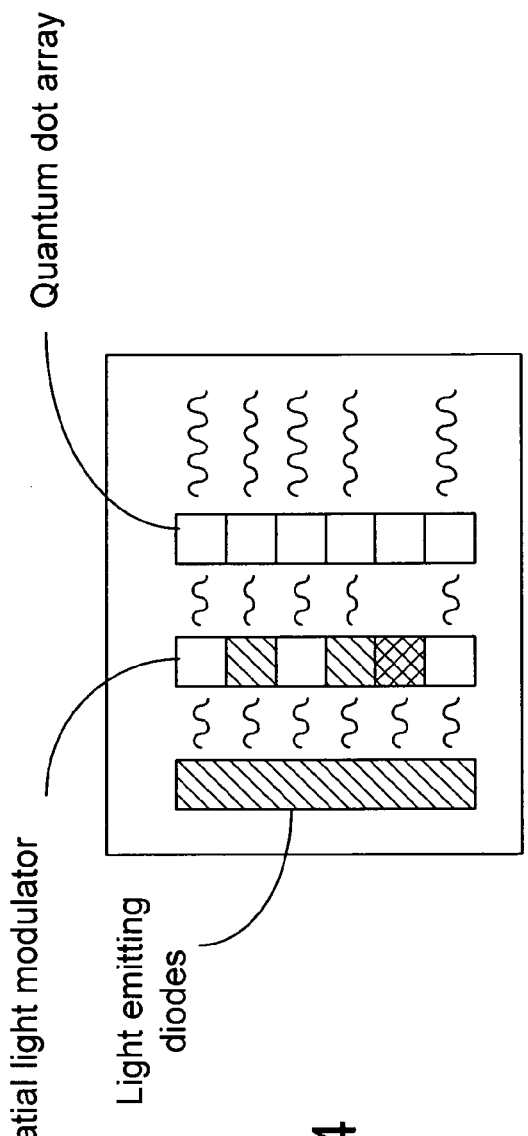
FIG. 4 shows a flash unit, according to one embodiment of the present invention.

FIG. 4 shows an emissive light source, according to another embodiment of the present invention. As shown in FIG. 4, the flash unit 10 may comprise one or more exciting light emitting diodes, a plurality of quantum dots arranged in an array, and one or more spatial light modulators placed between the light emitting diodes and the quantum dots in order to control the light output from the quantum dots. For example, the UV/NUV light emitting diodes can be used to excite single-size quantum dots, each of which gives a Gaussian or near-Gaussian spectrum. It is also possible that a mixture of quantum dots are used to produce a combined spectrum with a particular spectral distribution, for example.

Figure 5:
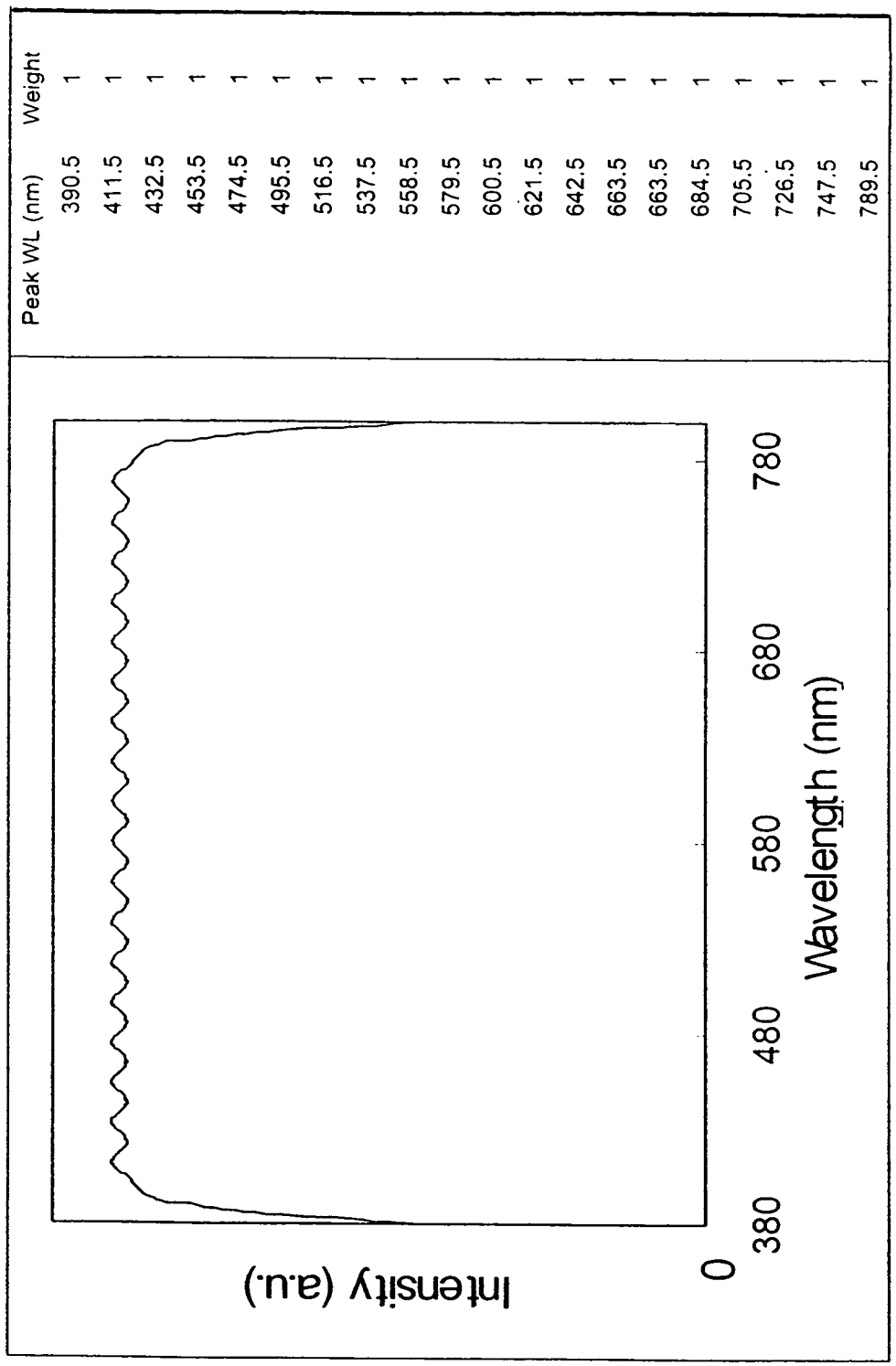
FIG. 5 shows an example of synthesized flat spectra from the output of 20 LEDs.

FIG. 5 shows an example of synthesized flat spectra from the output of 20 LEDs, wherein each of the LEDs produces a Gaussian or near-Gaussian spectrum of a different wavelength.

Figure 6:
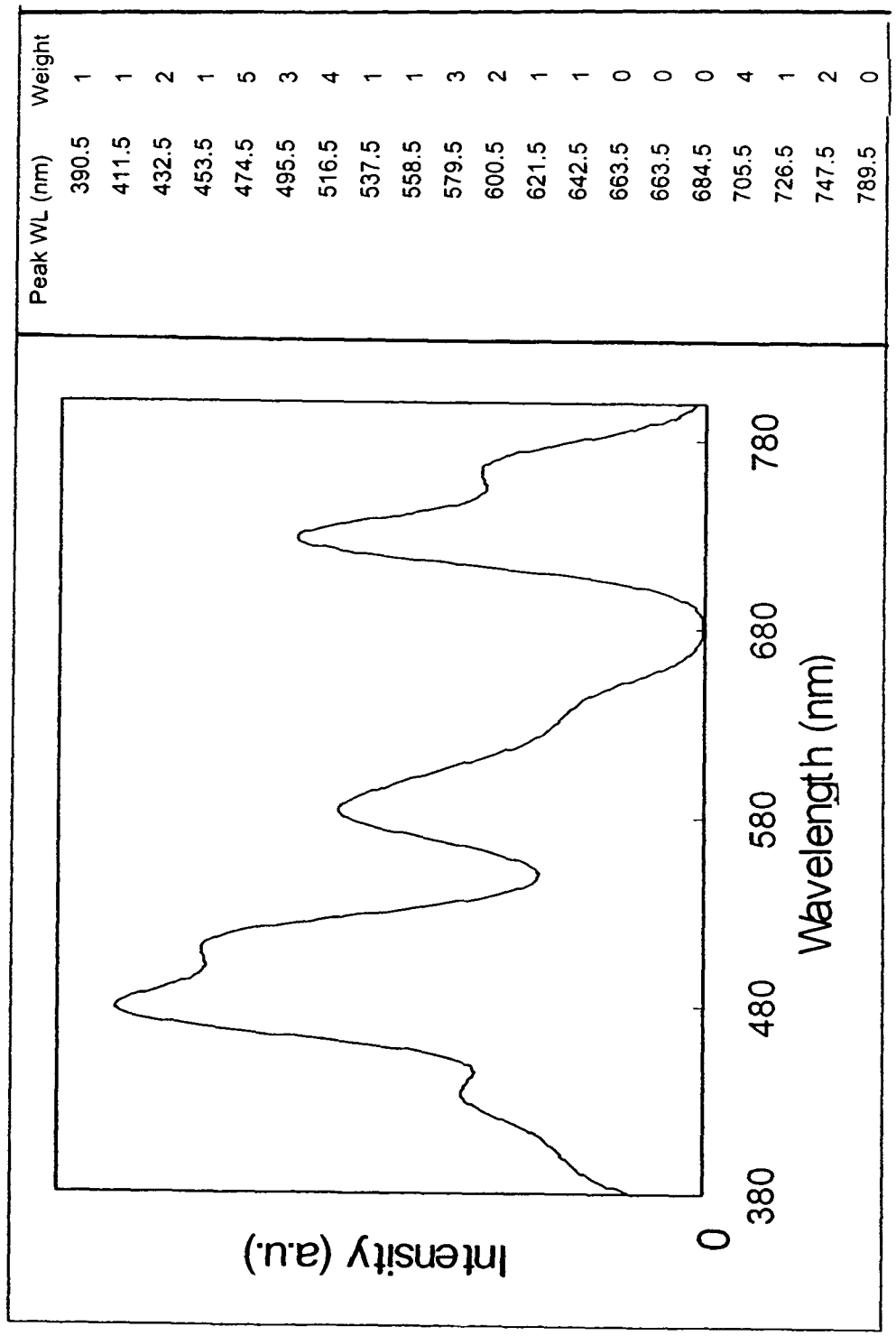
FIG. 6 shows an example of an arbitrary synthesized spectra from the output of 20 LEDs

FIG. 6 shows an example of an arbitrary synthesized spectra from the output of 20 LEDs.

Figure 7:
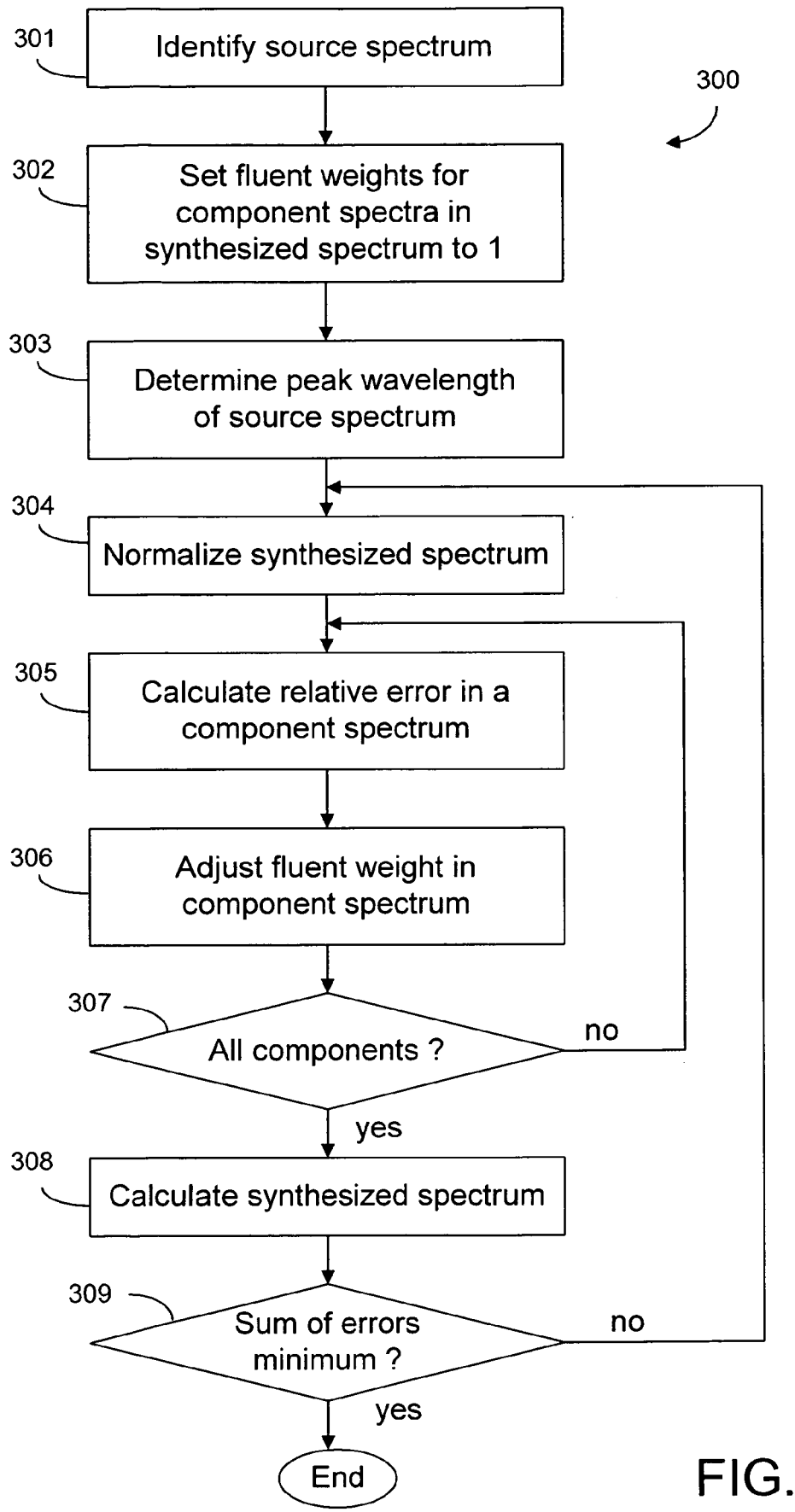
FIG. 7 is a flowchart for minimizing the spectral error of the synthesized spectrum.

FIG. 7 is a flowchart illustrating an exemplary procedure in determining the synthesized spectrum, according to one embodiment of the present invention. As shown in the flowchart 300, the goal is to obtain a synthesized spectrum $S'(\lambda)$ in reference to an illuminant or source spectrum $S(\lambda)$. At step 301, the source spectrum $S(\lambda)$ is obtained from the sensing unit 90 or retrieved from the LUT 70 in the camera (see FIGS. 1a and 1b). For simplicity, it is assumed that the source spectrum is normalized such that its peak is set equal to 1. If the number of light sources in the flash unit is n, then the synthesized spectrum is $S'(\lambda)$ which is expressed as the sum of $W_n S_n(\lambda)$, with $S_n(\lambda)$ being the base spectra of the light sources, and $W_n$ being the fluent weights. At step 302, each fluent weight $W_n$ is set equal to 1. At step 303, the wavelength $\lambda_p$ at which the spectral power distribution of $S(\lambda)$ reaches a maximum is determined, either from measurement or from the LUT. At step 304, the synthesized spectrum $S'(\lambda)$ is normalized to become $S'(\lambda_p)$, in each iteration, so that the peak in the normalized synthesized spectrum $S'(\lambda_p)$ is equal to 1. During the normalization process at step 304, the weight $W_n$ of each of the base spectra is adjusted to $W_n'$. At step 305, the relative error $\epsilon = S'(\lambda_n)/S(\lambda_n)$ for each base spectrum is computed, where $\lambda_n$ is the peak wavelength of that base spectrum. At step 306, the weight $W_n'$ is adjusted based on the relative error $\epsilon$ so that the error vanishes after the adjustment. After the weight $W_n'$ of each of the base spectrum has been adjusted, as determined at step 307, an interim synthesized spectrum is computed at step 308. Since the base spectra have finite distributions, there will be errors for other wavelengths in each base spectrum. These errors may be minimized by iteration. At step 309, if it is determined that the sum of errors has reached a predetermined value, the interim synthesized spectrum is used as the final synthesized spectrum. The weight $W_n'$ for each base spectrum can be used to adjust the output of the light source.

It should be noted that when a particular illuminant spectrum $S(\lambda)$ is stored in the LUT and the base spectra of the light sources in the flash unit are known, it is possible to store the fluent weights for the base spectra in the LUT once a synthesized spectrum is determined. For example, once a synthesized spectrum of a candle-lit scenario has been determined according to the base spectrum of the light sources in the flash unit, the fluent weights for this particular synthesized spectrum can be stored in the camera. If the user chooses to take a picture with this synthesized candle-lit spectrum through the user interface 80 (see FIGS. 1a and 1b), the control module 60 will adjust the output of the light sources in the flash unit 50 using the stored fluent weights in the LUT 70, for example.

In sum, the present invention provides a method and an apparatus for spectrum synthesis for use in a flash unit. The flash unit has at least two emissive light sources and each of the light sources can be adjusted relative to each other so that the outputs from the light sources can mimic a selected illumination scenario. The emissive light sources can be LEDs or other adjustable light sources, or a combination thereof. Furthermore, one or more non-adjustable light sources, such as Xenon flash lights, can be used in combination with one or more adjustable light sources in a flash unit. When the number of the light sources in the flash unit is too small, the difference between the synthesized spectrum and the spectrum of the selected illumination scenario can be significant. It is possible to use a mixture of quantum dots to tailor each light source so that the combined spectra from different light sources can reasonably mimic a number of frequently used illumination scenario. In general, the difference between the synthesized spectrum and the spectrum of the selected illumination scenario can be reduced by increasing the number of the light sources in a flash unit. In any case, the minimum number of the light sources is two.

Accordingly, the method for spectral synthesis, according to one embodiment of the present invention, comprising combining a plurality of emissive light sources for providing a combined output beam; and producing the output spectrum for the combined output beam at least partially based on a reference spectrum. The method further comprises sensing a spectrum of ambient light for providing the reference spectrum. Alternatively, the reference spectrum is selected from a plurality of stored spectra. In one embodiment of the present invention, the stored spectra are representable by a plurality of weighting values for said combining. In another embodiment of the present invention, the method further comprises: sensing a spectrum of ambient light for providing a sensed spectrum; and selecting the reference spectrum at least partly based on the sensed spectrum. In general, the plurality of emissive light sources comprise: a first emissive light source arranged to provide a first light beam of a first spectrum; and a second emissive light source arranged to provide a second light beam of a second spectrum, wherein at least part of the second spectrum is different from the first spectrum, and wherein at least one of the first emissive light source and the second emissive light source is adjustable for producing the output spectrum. In one embodiment of the present invention, at least one of the first emissive light source and the second emissive light source is arranged to receive a pulse-width modulated power for producing a corresponding light beam, and wherein pulse width of the modulated power is changed for adjusting said at least one of the first emissive light source and the second emissive light source. In another embodiment of the present invention, each of the plurality of emissive light sources is arranged to receive an electric current for producing a corresponding light beam, and wherein amplitude of the electric current received by at least one of said plurality of emissive light sources is adjustable for producing the output spectrum.

To state it differently, the method comprises providing a first emissive light source and a second emissive light source for a camera flash, wherein the first emissive light source is configured for producing a first light output with a first spectral distribution, and the second emissive light source is configured for producing a second light output with a second spectral distribution different from the first spectral distribution; and providing electrical access to the first and second emissive light sources such that at least the first light output is adjustable relative to the second light output for producing a combined light output with a third spectral distribution. Likewise, the apparatus, according to one embodiment of the present invention, includes a first emissive light source configured for producing a first light output with a first spectral distribution; and a second emissive light source configured for producing a second light output with a second spectral distribution different from the first spectral distribution, wherein at least the first light output is adjustable relative to the second light output for producing a combined light output with a third spectral distribution for a camera flash.

According to various embodiments of the present invention, the electrical current adjustment can be achieved by adjusting the amplitude of the current or by changing the pulse width in a pulse-width modulation. Moreover, one or more weighting values can be stored so that the adjustment can be based on at least one stored weighting value in order to produce the combined light output with the third spectral distribution.

It is possible to store a plurality of illuminant spectral distributions so as to allow a user to select the third spectral distribution from the illuminant spectral distributions. According to various embodiments of the present invention, the method further comprises obtaining a reference spectral distribution so that the adjustment can be at least partially based on the reference spectral distribution, wherein the reference spectral distribution is obtained by sensing the ambient light or obtained from a memory, such as a look-up table.

The method, according to various embodiments of the present invention, can be carried out by a software program embedded in a computer readable storage medium or embedded in a processor having programming codes to carry out the various steps as described above.

The camera flash unit, according to various embodiments of the present invention, comprises a plurality of emissive light sources for providing a combined output beam; and a power receiver for receiving electric current to power each of the plurality of emissive light sources, wherein the electric current to power at least some of the plurality of emissive light sources is adjustable so as to produce an output spectrum for the combined output beam at least partially based on a reference spectrum. The plurality of emissive light sources comprise:

a first emissive light source arranged to provide a first light beam of a first spectrum; and a second emissive light source arranged to provide a second light beam of a second spectrum, wherein at least part of the second spectrum is different from the first spectrum, and wherein at least one of the first emissive light source and the second emissive light source is adjustable for producing the output spectrum. The flash unit may include a battery for providing electrical current to the first and second emissive light sources. The flash unit may also include a first current source for providing electrical current to the first emissive light source, and a second current source for providing electrical current to the first emissive light source. The flash unit may include a control module configured to provide electrical current to each of the first and second emissive light sources, wherein at least the electrical current to the first emissive light source is adjustable. The electrical current to the first emissive light source can be provided in a pulse-width modulation mode and the electrical current to the first emissive light source is adjustable by changing pulse width in the modulation mode. In a camera having an above-described flash unit, it is possible to include a look up table configured for storing weighting values to allow the control module to provide electrical current to each of the first and second emissive light sources based on the weighting values. The look up table can be configured to store a plurality of weighting values indicative of a plurality of illumination scenarios. The camera can be a digital camera having a solid-state sensor for capturing an image formed at the image plane of a lens module, or a film-based camera configured for placing a section of photographic film at the image plane for image capturing.

The present invention also provides an apparatus, which comprises a connector for receiving a flash unit, wherein the flash unit comprises a plurality of emissive light sources arranged to receive electric current for producing a combined light output; and a processor configured to adjust the electric current so as to produce an output spectrum of the combined light output at least based on a reference spectrum. In one embodiment of the present invention, the apparatus comprises a sensor for sensing a spectrum of ambient light for providing the reference spectrum. In another embodiment of the present invention, the apparatus comprises a memory for storing data indicative of a plurality of stored spectra, wherein the reference spectrum is selected from the stored spectra. The reference spectrum can be selected based on the sensed spectrum or by a user who determines the type of ambient light source at the time of picture taking. In one embodiment of the present invention, the stored spectra are representable by a plurality of weighting values for producing the combined light output.

In one embodiment, the apparatus comprises a first emissive light source configured for producing a first light output with a first spectral distribution; a second emissive light source configured for producing a second light output with a second spectral distribution different from the first spectral distribution, wherein at least the first light output is adjustable relative to the second light output for producing a combined light output with a third spectral distribution for a camera flash; electrical connectors for providing electrical access to the first and second emissive light sources so as to adjust at least the first light output, and/or a battery for providing electrical current to the first and second emissive light sources, and/or a first current source for providing electrical current to the first emissive light source, and a second current source for providing electrical current to the first emissive light source.

The apparatus may have a control module configured to provide electrical current to each of the first and second emissive light sources, wherein at least the electrical current to the first emissive light source is adjustable, wherein the electrical current to the first emissive light source is provided in a pulse-width modulation mode and the electrical current to the first emissive light source is adjustable by changing the pulse width in the modulation mode.

The apparatus may have a look up table configured for storing weighting values to allow the control module to provide electrical current to each of the first and second emissive light sources based on the weighting values, wherein the look up table is configured to store a plurality of weighting values indicative of a plurality of illumination scenarios.

The apparatus can be a stand-alone camera, or an electronic device, such as a mobile terminal. In one embodiment of the present invention, the apparatus comprises a memory for storing a software program having programming codes for carrying out the method of producing an output spectrum of a flash unit as described above. In a different embodiment of the present invention, the programming codes are embedded in a processor. In yet another different embodiment of the present invention, the apparatus is configured to receive a memory unit, such as a computer readable storage medium for storing the afore-mentioned software program.

The present invention also provides a camera, comprising a lens module for forming an image at an image plane; an apparatus for providing illumination; and an image forming medium for capturing the image formed at the image plane, wherein the image forming medium comprises a solid-state image sensor or a photographic film. The apparatus comprises a mobile terminal.

Briefly, the present invention provides a method and apparatus for spectrum synthesis in a flash unit. The flash unit has two or more emissive light sources with different spectral distributions. Each of the light sources can be adjusted relative to each other so that the outputs from the light sources can be combined to mimic the spectral distribution of a selected illumination scenario. A look-up table is used to store a plurality of weighting values so that different weighting values can be used to produce various synthesized spectra from the different spectral distributions of the emissive light sources. Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for producing an output spectrum of a flash unit, comprising:
   combining a plurality of emissive light sources for providing a combined output beam; and
   producing the output spectrum for the combined output beam, the output spectrum at least partially based on a reference spectrum, the reference spectrum selected from a plurality of stored spectra, each of the stored spectra indicative of one or more ambient illumination sources associated with one or more respective illumination scenarios.

2. The method of claim 1, further comprising:
   sensing a spectrum of ambient light for providing the reference spectrum.

3. The method of claim 1, wherein the stored spectra are representable by a plurality of weighting values for said combining.

4. The method of claim 1, further comprising:
   sensing a spectrum of ambient light for providing a sensed spectrum; and
   selecting the reference spectrum at least partly based on the sensed spectrum.

5. The method of claim 1, wherein the plurality of emissive light sources comprise:
   a first emissive light source arranged to provide a first light beam of a first spectrum; and
   a second emissive light source arranged to provide a second light beam of a second spectrum, wherein at least part of the second spectrum is different from the first spectrum, and wherein at least one of the first emissive light source and the second emissive light source is adjustable for producing the output spectrum.

6. The method of claim 5, wherein said at least one of the first emissive light source and the second emissive light source is arranged to receive a pulse-width modulated power for producing a corresponding light beam, and wherein pulse width of the modulated power is changed for adjusting said at least one of the first emissive light source and the second emissive light source.

7. A flash unit for use in a camera, comprising:
   a plurality of emissive light sources for providing a combined output beam; and a power receiver for receiving electric current to power each of the plurality of emissive light sources, wherein the electric current to power at least some of the plurality of emissive light sources is adjustable so as to produce an output spectrum for the combined output beam, the output spectrum at least partially based on a reference spectrum, the reference spectrum selected from a plurality of stored spectra, each of the spectra indicative of one or more ambient illumination sources associated with one or more respective illumination scenarios.

8. The flash unit of claim 7, wherein the plurality of emissive light sources comprise:
   a first emissive light source arranged to provide a first light beam of a first spectrum; and
   a second emissive light source arranged to provide a second light beam of a second spectrum, wherein at least part of the second spectrum is different from the first spectrum, and wherein at least one of the first emissive light source and the second emissive light source is adjustable for producing the output spectrum.

9. An apparatus, comprising:
   a connector for receiving a flash unit, wherein the flash unit comprises a plurality of emissive light sources arranged to receive electric current for producing a combined light output;
   a processor configured to adjust the electric current so as to produce an output spectrum of the combined light output, the output spectrum at least based on a reference spectrum, the reference spectrum selected from a plurality of stored spectra, each of the stored spectra indicative of one or more ambient illumination sources associated with one or more respective illumination scenarios.

10. The apparatus of claim 9, further comprising:
    a sensor for sensing a spectrum of ambient light for providing the reference spectrum.

11. The apparatus of claim 9, wherein the stored spectra are representable by a plurality of weighting values for producing the combined light output.

12. The apparatus of claim 9, wherein the plurality of emissive light sources comprise:
    a first emissive light source arranged to provide a first light beam of a first spectrum; and
    a second emissive light source arranged to provide a second light beam of a second spectrum, wherein at least part of the second spectrum is different from the first spectrum, and wherein at least one of the first emissive light source and the second emissive light source is adjustable for producing the output spectrum.

13. The apparatus of claim 12, wherein the electric current received by at least one of the first emissive light source and the second emissive light source is pulse-width modulated, and wherein pulse width of the modulated power is changed for adjusting said at least one of the first emissive light source and the second emissive light source.

14. The apparatus of claim 9, comprising a camera.

15. The apparatus of claim 9, comprising a mobile terminal.

16. The method of claim 5, wherein at least one of the first emissive light source and the second emissive light source comprises:
    one or more excitable light emission materials, and
    at least one light emitting unit arranged to excite said one or more excitable light emission materials for providing at least one of the first and second light beams.

17. The method of claim 16, further comprising:
    providing a spatial light modulator for controlling light output from said one or more excitable light emission materials.

18. The apparatus of claim 12, wherein at least one of the first emissive light source and the second emissive light source comprises:
    one or more excitable light emission materials, and
    at least one light emitting unit arranged to excite said one or more excitable light emission materials for providing at least one of the first and second light beams.

19. The apparatus of claim 18, further comprising:
    a spatial light modulator for controlling light output from said one or more excitable light emission materials.

20. The apparatus of claim 18, wherein said one or more excitable light emission materials comprise one or more quantum dots and said at least one light emitting unit comprises one or more light-emitting diodes.

21. The method of claim 1, wherein said one or more illumination sources comprise ambient illumination sources.

* * * * *